US012569876B1

(12) United States Patent
Wu et al.

(10) Patent No.: US 12,569,876 B1
(45) Date of Patent: Mar. 10, 2026

(54) PLASTIC SPRAYING PROCESS FOR SURFACE OF PLASTIC FURNITURE PRODUCT

(71) Applicant: Taizhou Pushangqu Gardening Products Co., Ltd, Taizhou (CN)

(72) Inventors: Yuxuan Wu, Taizhou (CN); Jing Wu, Taizhou (CN); Huanchao Chen, Taizhou (CN)

(73) Assignee: Taizhou Pushangqu Gardening Products Co., Ltd, Taizhou (CN)

( * ) Notice: Subject to any disclaimer, the term of this patent is extended or adjusted under 35 U.S.C. 154(b) by 0 days.

(21) Appl. No.: 18/951,825

(22) Filed: Nov. 19, 2024

(30) Foreign Application Priority Data

Oct. 9, 2024 (CN) ......................... 202411400607.9

(51) Int. Cl.
*B05D 3/00* (2006.01)
*B05D 1/00* (2006.01)

(52) U.S. Cl.
CPC ............. *B05D 3/005* (2013.01); *B05D 1/007* (2013.01)

(58) Field of Classification Search
CPC ........ B05D 1/007; B05D 1/045; B05D 3/005; B05D 2350/60; B05D 2401/32
See application file for complete search history.

(56) References Cited

U.S. PATENT DOCUMENTS 5,021,297 A * 6/1991 Rhue ........................ B05D 7/02 427/195
5,194,328 A * 3/1993 Suzuki ................... B05D 7/546 428/323
5,206,073 A * 4/1993 Suzuki ..................... B05D 7/02 428/323
5,565,240 A * 10/1996 Smith .................. B05D 3/0218 427/195
2010/0266782 A1* 10/2010 Langlois .................. B05D 1/12 427/195

FOREIGN PATENT DOCUMENTS

| | | | | |
|---|---|---|---|---|
| CN | 107413598 A | * 12/2017 | | B05D 1/06 |
| CN | 219024769 U | 5/2023 | | |
| CN | 220780820 U | 4/2024 | | |
| CN | 221619825 U | 8/2024 | | |
| EP | 0372740 A2 | * 6/1990 | | C08J 7/0427 |

* cited by examiner

*Primary Examiner* — William P Fletcher, III
(74) *Attorney, Agent, or Firm* — Ricky Lam

(57) ABSTRACT

A plastic spraying process for a surface of a plastic furniture product is provided, which includes the following steps of conducting treatment: adding a conductive filler and a temperature-resistant filler in a granulating process and granulating to obtain plastic particles, and using the plastic particles to prepare a plastic furniture product; or, coating a conductive primer on a surface of the plastic furniture product, components of the conductive primer containing a temperature-resistant accelerator; plastic powder spraying: sending the plastic furniture product to a spray room, and spraying the plastic powder on the surface of the plastic furniture product by a high-pressure electrostatic spray gun; curing: curing in a drying tunnel; and cooling: cooling to room temperature to finish plastic spraying. Through plastic spraying, a surface isolation protective layer is formed, which improves weather resistance, aging resistance and wear resistance of the plastic furniture product.

6 Claims, No Drawings

PLASTIC SPRAYING PROCESS FOR SURFACE OF PLASTIC FURNITURE PRODUCT

FIELD OF THE INVENTION

The present invention relates to the technical field of surface treatment of plastic furniture products, in particular to a plastic spraying process for a surface of a plastic furniture product.

BACKGROUND OF THE INVENTION

Plastic furniture has become a major category of modern furniture products by way of being formed integrally or formed separately and assembled by mould pressing. Existing common plastic furniture products are mainly molded by plastic particles at one time, surface texture of which depends on a forming mould, thus having the shortcomings of single color, insufficient weather resistance and wear resistance, so that increasingly growing needs of customers cannot be met. Therefore, secondary surface treatment on plastic furniture products has become an industrial trend.

Conventional surface treatment processes for the plastic furniture products include: electroplating, vacuum coating, painting, and the like. A paint film thickness formed after treatment is thin (30 μm to 50 μm), while daily use frequency of the plastic furniture products is high, and the thin film thickness is easy to cause wear and tear during use, which will affect use experience of the plastic furniture. In addition, some plastic furniture is used outdoors, and a surface paint film is prone to crack or even flake off in sun and rain.

Plastic spraying is a surface treatment method of spraying plastic powder on a part, which can form an ultra-high film thickness. In order to improve user experience, plastic furniture products are sprayed with plastic. Plastic furniture is generally large in size, convenient for plastic spraying process, and suitable for large-scale workpiece processing. Plastic spraying has the advantages of no pollution to the environment, no toxicity to human body, excellent appearance quality of coating, strong adhesion and mechanical strength, short curing time of spraying construction and the like while construction. In the plastic spraying process, plastic powder is charged by a high-voltage electrostatic device, and under the action of electric field, paint is sprayed on a surface of a workpiece, and the powder will be uniformly adsorbed on the surface of the workpiece to form a powdery coating. The powder coating is leveled and solidified after high temperature baking, and plastic particles will melt into a dense final protective coating with different effects and firmly adhere to the surface of the workpiece. However, the surface of the sprayed workpiece must be conductive, while the plastic furniture products are made of non-conductive materials, so the surface of the plastic furniture product cannot be sprayed directly.

SUMMARY OF THE INVENTION

The present invention aims at disclosing a plastic spraying process for a surface of a plastic furniture product to the public to make up for the above shortcomings. The surface of the plastic furniture product is charged by pretreatment, so that the plastic spraying treatment is effectively completed, and temperature resistance of the plastic furniture product is improved and a plastic spraying cost is reduced by adding a temperature-resistant material.

The technical solutions of the present invention are realized as follows.

A plastic spraying process for a surface of a plastic furniture product comprises the following steps of:

step 1, conducting treatment: adding a conductive filler and a temperature-resistant filler in a granulating process and granulating to obtain plastic particles, and using the plastic particles to prepare a plastic furniture product; or, coating a conductive primer on a surface of the plastic furniture product, components of the conductive primer containing a temperature-resistant accelerator;

step 2, plastic powder spraying: sending the plastic furniture product to a spray room, and spraying the plastic powder on the surface of the plastic furniture product by a high-pressure electrostatic spray gun;

step 3, curing: curing in a drying tunnel; and step 4, cooling: cooling to room temperature to finish plastic spraying.

The conductive primer consists of 98% to 99% of primer and 1% to 2% of conductive liquid, and components of the primer comprise: 60 parts to 70 parts of epoxy resin, 10 parts to 15 parts of butyl acetate, 6 parts to 10 parts of xylene, 10 parts to 20 parts of chlorinated polyolefin and 1 part to 2 parts of temperature-resistant accelerator, and the temperature-resistant accelerator is a silane coupling agent; and components of the conductive liquid comprises: 40 parts to 50 parts of polyaniline, 25 parts to 35 parts of ITO and 20 parts to 30 parts of nano silver, and all the parts are parts by mass.

A conductive synergist is added to the conductive primer, and components of the conductive synergist comprise 1 part to 5 parts of surfactant, 0.5 part to 2 parts of dispersant, 0.1 part to 1 part of coupling agent and 2 parts to 8 parts of plasticizer.

The surfactant is polyoxyethylene ether, the dispersant is polyvinylpyrrolidone, the coupling agent is γ-Aminopropyltriethoxysilane, and the plasticizer is dibutyl phthalate.

A preparation method of the conductive synergist comprises: adding the surfactant and the dispersant into a solvent in proportion, and stirring for 15 minutes to 30 minutes to prepare a mixed solution; gradually adding the coupling agent into the mixed solution, and keeping stirring until the coupling agent is completely dissolved; and finally adding the plasticizer and continuously stirring to ensure uniform distribution.

An addition amount of the conductive synergist is 0.5% to 2% of a mass of the conductive primer.

The temperature-resistant filler is glass fiber, talc powder or plant fiber.

The conductive filler is conductive carbon black, nano metal particle or conductive fiber.

A plurality of spray rooms are provided, and the plastic furniture product passes through the plurality of spray rooms in turn.

In the step 3, a curing temperature of the plastic powder is controlled within 210° C.

Compared with the prior art, the present invention has the advantages as follows.

According to the plastic spraying process for the surface of the plastic furniture product of the present invention, the surface of the plastic furniture product is charged by conducting treatment on the plastic furniture product, so that the subsequent plastic spraying can be successfully completed; and the temperature resistance of the plastic furniture product is improved by adding the temperature-resistant material. After testing, the temperature resistance of the plastic furniture product can be improved to more than 220° C. (temperature resistance of an ordinary plastic furniture product is about 150° C.), so that a curing temperature and a curing temperature of the plastic powder can be improved, and the plastic spraying cost is reduced.

The conducting treatment is achieved in two ways. Firstly, by adding the conductive filler and the temperature-resistant filler in the granulating process, the conductive filler, the temperature-resistant filler and the raw materials can be mixed more evenly, and conductivity uniformity of the surface of the plastic furniture product can be improved. Secondly, the conductive primer is coated on the surface of the plastic furniture product, and the primer and the conductive liquid are mixed in advance to form the conductive primer, so that the conductive liquid and the primer are mixed evenly, and the conductivity uniformity of the surface of the plastic furniture product can also be improved.

An isolation protective layer is formed on the surface of the plastic furniture product by plastic spraying, which improves weather resistance, aging resistance and wear resistance of the plastic furniture product, thus improving a service life of the plastic furniture product.

DETAILED DESCRIPTION OF SOME EMBODIMENTS

The present invention will be further described in detail below.

According to a plastic spraying process for a surface of a plastic furniture product of the present invention, the surface of the plastic furniture product is charged by conducting treatment on the plastic furniture product, so that subsequent plastic spraying can be successfully completed. By adding a temperature-resistant material, temperature resistance of the plastic furniture product is improved to more than 220° C. (temperature resistance of an ordinary plastic furniture product is about 150° C.). As the temperature resistance of the plastic furniture product is improved, plastic powder with higher curing temperature may be used for plastic spraying, the plastic powder may not be limited to low-temperature plastic powder (with a curing temperature below 125° C.), and a selling price of low-temperature plastic powder is higher than that of ordinary plastic powder. A plastic spraying cost can be reduced by using the plastic spraying process of the present invention.

Plastic spraying is carried out on the plastic furniture product, and after the plastic powder is cured and cooled, an isolation protective layer is formed on the surface of the plastic furniture product, which improves weather resistance, aging resistance and wear resistance of the plastic furniture product, thus improving a service life of the plastic furniture product. A thickness of the isolation protective layer formed after plastic spraying may reach 80 μm to 180 μm, which is 2 times to 3 times of a thickness of an ordinary spray paint film, and defects such as bubbles and flow marks on the surface are avoided. In an outdoor use environment, the plastic furniture can be effectively protected. Compared with other treatment processes, the ultra-high film thickness of the isolation protective layer has a better defect concealing effect, thus reducing use requirements on the raw materials of the plastic furniture product, improving a utilization rate of the plastic raw materials, and achieving an object of cost reducing and efficiency increasing. In addition, when spraying plastic, a plurality of spray guns may be used to spray at the same time to improve spraying efficiency. A plurality of spray guns may also be used for multi-color spraying to enhance color richness of the product. During plastic spraying, a powder collecting device is arranged in a plastic powder spraying section, so that fallen powder (uncured plastic powder) can be recycled for secondary use, which can further reduce the cost and is more environmental-friendly.

Conducting treatment of the plastic spraying process for the surface of the plastic furniture product according to the present invention may be achieved by two ways.

Example 1

A plastic spraying process for a surface of a plastic furniture product comprises the following steps.

Step 1, conducting treatment: adding a conductive filler and a temperature-resistant filler in a granulating process and granulating to obtain plastic particles, and using the plastic particles to prepare a plastic furniture product; wherein the conductive filler is conductive carbon black, nano metal particle or conductive fiber, and the temperature-resistant filler is glass fiber, talc powder or plant fiber. The surface of the plastic furniture product is charged by adding the conductive filler, so that the subsequent plastic spraying can be successfully completed, while the temperature resistance of the plastic furniture product is improved by adding the temperature-resistant filler. The plastic particles can be made into the plastic furniture product by injection molding, blow molding, plastic absorption, molding, rotational molding and other processes.

Step 2, plastic powder spraying: sending the plastic furniture product to a spray room, and spraying the plastic powder on the surface of the plastic furniture product by a high-pressure electrostatic spray gun. As an extension, a plurality of spray rooms are provided, and the plastic furniture product passes through the plurality of spray rooms in turn. Each spray room carries out plastic spraying of plastic powders with different colors, and a plurality of spray guns may be arranged in the same spray booth to improve plastic spraying efficiency.

Step 3, curing: curing in a drying tunnel, wherein a curing temperature of the plastic powder is controlled within 210° C.

Step 4, cooling: cooling to room temperature to finish plastic spraying.

In this example, by adding the conductive filler and the temperature-resistant filler in the granulating process, the conductive filler, the temperature-resistant filler and the raw materials can be mixed sufficiently and evenly, and conductivity uniformity of the surface of the plastic furniture product can be improved, which is beneficial for improving the plastic spraying effect.

Example 2

A plastic spraying process for a surface of a plastic furniture product comprises the following steps.

Step 1, conducting treatment: after a plastic furniture product is made by injection molding, coating a conductive primer on a surface of the plastic furniture product, components of the conductive primer containing a temperature-resistant accelerator.

The conductive primer consists of 98% to 99% of primer and 1% to 2% of conductive liquid, and components of the primer comprise: 60 parts to 70 parts of epoxy resin, 10 parts to 15 parts of butyl acetate, 6 parts to 10 parts of xylene, 10 parts to 20 parts of chlorinated polyolefin and 1 part to 2 parts of temperature-resistant accelerator, and the temperature-resistant accelerator is a silane coupling agent; and components of the conductive liquid comprises: 40 parts to 50 parts of polyaniline, 25 parts to 35 parts of ITO and 20 parts to 30 parts of nano silver, and all the parts are parts by mass.

A conductive synergist is added to the conductive primer, and components of the conductive synergist comprise 1 part to 5 parts of surfactant, 0.5 part to 2 parts of dispersant, 0.1 part to 1 part of coupling agent and 2 parts to 8 parts of plasticizer.

The surfactant is polyoxyethylene ether, the dispersant is polyvinylpyrrolidone, the coupling agent is γ-Aminopropyltriethoxysilane, and the plasticizer is dibutyl phthalate.

The conductive synergist helps to form a better interface combination between the primer and the conductive liquid, and promotes uniform distribution and improvement of conductivity. The conductive synergist is helpful to improve the conductivity and coating uniformity of plastic surface during plastic spraying, and further optimize a plastic spraying effect.

Specifically, the polyoxyethylene ether is a nonionic surfactant, which can reduce an interfacial tension between the primer and the conductive liquid and promote the two to be better combined. One end of a polyoxyethylene ether molecule has a good affinity with the epoxy resin, while the other end of the polyoxyethylene ether molecule interacts with the polyaniline and nano silver particles in the conductive liquid, thus enhancing compatibility between two phases and improving uniform dispersion of the conductive liquid in the primer.

The polyvinylpyrrolidone can effectively prevent agglomeration of the nano-silver particles and ITO and other conductive components in the conductive liquid. The polyvinylpyrrolidone forms a protective layer by adsorption with surfaces of nano particles, which prevents agglomeration caused by van der Waals force or electrostatic action between the particles and ensures uniform distribution of conductive components in the conductive liquid in the primer, thus improving the conductivity and consistency of the coating after plastic spraying.

The γ-Aminopropyltriethoxysilane has active amino groups and hydrolyzable ethoxy groups. The γ-Aminopropyltriethoxysilane can act as a chemical bridge between the epoxy resin in the primer and the inorganic materials (such as nano silver and ITO) in the conductive liquid. Through chemical bonding, the coupling agent can enhance adhesion of an interface between organic and inorganic phases and form a stable chemical network structure, thus improving mechanical strength and adhesion of the coating after plastic spraying.

The dibutyl phthalate can increase flexibility and impact resistance of the primer. The plasticizer gives the coating better flexibility by reducing interaction between molecular chains in the primer, thus improving cracking resistance and durability of the coating after plastic spraying.

A preparation method of the conductive synergist comprises: adding the surfactant and the dispersant into a solvent in proportion, and stirring for 15 minutes to 30 minutes to prepare a mixed solution; gradually adding the coupling agent into the mixed solution, and keeping stirring until the coupling agent is completely dissolved; and finally adding the plasticizer and continuously stirring to ensure uniform distribution.

The prepared conductive synergist is filtered by a 0.2 micron filter to remove impurities.

The conductive synergist above is used as follows: the conductive synergist accounting for 0.5% to 2% of a mass of the conductive primer is added into the conductive primer, so that the primer and the conductive liquid are mixed more evenly, and interaction between the primer and the conductive liquid is enhanced, and the adhesion and the conductivity during plastic spraying are improved.

Step 2, plastic powder spraying: sending the plastic furniture product to a spray room, and spraying the plastic powder on the surface of the plastic furniture product by a high-pressure electrostatic spray gun. As an extension, a plurality of spray rooms are provided, and the plastic furniture product passes through the plurality of spray rooms in turn. Each spray booth carries out plastic spraying of plastic powders with different colors, and multiple spray guns may be arranged in the same spray room to improve plastic spraying efficiency.

Step 3, curing: curing in a drying tunnel, wherein a curing temperature of the plastic powder is controlled within 210° C.

Step 4, cooling: cooling to room temperature to finish plastic spraying.

In this example, the conductive primer is coated on the surface of the plastic furniture product, and the primer and the conductive liquid are mixed in advance to form the conductive primer, so that the conductive liquid and the primer are mixed evenly, and conductivity uniformity of the surface of the plastic furniture product can be improved, which is beneficial for improving the plastic spraying effect.

Performances of the plastic furniture products prepared in the above examples were tested:

| Test content | Test method | Qualified standard | Example 1 | Example 2 |
|---|---|---|---|---|
| Temperature resistance | The plastic furniture product was put into an incubator, and the temperature was gradually increased. Each test temperature was kept for 10 minutes until the plastic furniture product was deformed. | Above 220° C. | 250° C. | 230° C. |
| Paint film thickness | A thickness gauge was used to measure eight uniform points on the surface of the coating uniformity to measure a coating thickness | 80 μm to 180 μm | 98 μm | 126 μm |

-continued

| Test content | Test method | Qualified standard | Example 1 | Example 2 |
|---|---|---|---|---|
| Paint film hardness | GB/T 6739-2006 | Above 1 H | 2 H | 2 H |
| Adhesion | GB/T 9286-2021 | Grade 1 | Grade 1 | Grade 1 |
| Impact strength | The test sample was flat on a table, and a front side of the sample was impacted by 50 $kg/cm^2$. The same sample was subjected to impact test for three times, and then observed with a four-fold magnifying glass after the test. | No cracks, wrinkles and peeling on the surface of the coating | No cracks, wrinkles and peeling on the surface of the coating | No cracks, wrinkles and peeling on the surface of the coating |
| Water resistance | A test plate was soaked in distilled water or deionized water for 100 hours, and then taken out for observation. | Grade 1 | Grade 1 | Grade 1 |
| High-temperature resistance | The sample was put in an incubator at 200° C. ± 5° C. for 24 hours, then taken out and restored to normal temperature, and then the coating was tested. | Grade 1 | Grade 1 | Grade 1 |
| Low-temperature resistance | The sample was put in an incubator at −25° C. ± 5° C. for 24 hours, then taken out and restored to normal temperature, and then the coating was tested. | Grade 1 | Grade 1 | Grade 1 |
| Light aging resistance | Irradiated by continuous operation of an ultraviolet lamp for 200 hours in total. | The paint film had no powdering and peeling | The paint film had no powdering and peeling | The paint film had no powdering and peeling |
| Alcohol-wiping resistant resistance | The surface of the coating was wiped back and forth with a soft cloth dipped in alcohol with a force of 10N. | The paint film had no peeling and fading | The paint film had no peeling and fading | The paint film had no peeling and fading |

The foregoing descriptions are merely embodiments of the present invention, but are not intended to limit the implementation and protection scope of the present invention. All solutions obtained from equivalent replacements or obvious changes made using the contents of the specification and the drawings of the present invention shall all be included in the protection scope of the present invention.

What is claimed is:

1. A plastic spraying process for a surface of a plastic furniture product, comprising the following steps of:

step 1, conducting treatment: coating a conductive primer on a surface of a plastic furniture product, wherein components of the conductive primer containing a temperature-resistant accelerator;

step 2, plastic powder spraying: sending the plastic furniture product to a spray room, and spraying the plastic powder on the surface of the plastic furniture product by a electrostatic spray gun;

step 3, curing: curing in a drying tunnel; and step 4, cooling: cooling to room temperature to complete plastic spraying process;

wherein the conductive primer consists of 98% to 99% of primer and 1% to 2% of conductive liquid, and components of the primer comprise: 60 parts to 70 parts of epoxy resin, 10 parts to 15 parts of butyl acetate, 6 parts to 10 parts of xylene, 10 parts to 20 parts of chlorinated polyolefin and 1 part to 2 parts of temperature-resistant accelerator, and the temperature-resistant accelerator is a silane coupling agent; and components of the conductive liquid comprise: 40 parts to 50 parts of polyaniline, 25 parts to 35 parts of ITO and 20 parts to 30 parts of nano silver, and all the parts are parts by mass.

2. The plastic spraying process for the surface of the plastic furniture product according to claim 1, wherein a conductive synergist is added to the conductive primer, and components of the conductive synergist comprise 1 part to 5 parts of surfactant, 0.5 part to 2 parts of dispersant, 0.1 part to 1 part of coupling agent and 2 parts to 8 parts of plasticizer.

3. The plastic spraying process for the surface of the plastic furniture product according to claim 2, wherein the surfactant is polyoxyethylene ether, the dispersant is polyvinylpyrrolidone, the coupling agent is γ-Aminopropyltriethoxysilane, and the plasticizer is dibutyl phthalate.

4. The plastic spraying process for the surface of the plastic furniture product according to claim 3, wherein a preparation method of the conductive synergist comprises: adding the surfactant and the dispersant into a solvent in proportion, and stirring for 15 minutes to 30 minutes to prepare a mixed solution; gradually adding the coupling agent into the mixed solution, and keeping stirring until the coupling agent is completely dissolved; and finally adding the plasticizer and continuously stirring until the plasticizer is completely dissolved.

5. The plastic spraying process for the surface of the plastic furniture product according to claim 4, wherein an addition amount of the conductive synergist is 0.5% to 2% of a mass of the conductive primer.

6. The plastic spraying process for the surface of the plastic furniture product according to claim 1, wherein a plurality of spray rooms are provided, and the plastic furniture product passes through the plurality of spray rooms in turn.

* * * * *